(12) United States Patent
Whitehead

(10) Patent No.: US 6,304,365 B1
(45) Date of Patent: Oct. 16, 2001

(54) ENHANCED EFFECTIVE REFRACTIVE INDEX TOTAL INTERNAL REFLECTION IMAGE DISPLAY

(75) Inventor: Lorne A. Whitehead, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/585,552

(22) Filed: Jun. 2, 2000

(51) Int. Cl.$^7$ ............................ G02B 26/00; G02B 26/08; G02B 27/10; G02F 1/07

(52) U.S. Cl. .................... 359/296; 359/263; 359/222; 359/228; 359/618

(58) Field of Search .................................. 359/296, 228, 359/222, 263, 618, 619, 621, 291

(56) References Cited

U.S. PATENT DOCUMENTS

| | | |
|---|---|---|
| 3,571,511 | 3/1971 | Myer . |
| 3,612,653 | 10/1971 | Rajchman . |

(List continued on next page.)

FOREIGN PATENT DOCUMENTS

| | | |
|---|---|---|
| 4343808A1 | 6/1995 | (DE) . |
| 0023741A1 | 2/1981 | (EP) . |
| 0807832A2 | 11/1997 | (EP) . |
| 2265024A | 9/1993 | (GB) . |

OTHER PUBLICATIONS

3M Fluorinert™ Electronic Liquid brochure, http://www.3m.com/fluids/florinrt.html, Sep., 1998.

"Patented fiber switch revs speed, cuts cost", George Kotelly, in "Lightwave" Oct., 1995 web site publication of PennWell Publishing Co., Tulsa, OK.

(List continued on next page.)

*Primary Examiner*—Georgia Epps
*Assistant Examiner*—Michael A. Lucas
(74) *Attorney, Agent, or Firm*—Oyen Wiggs Green & Mutala

(57) ABSTRACT

The invention provides an image display for viewing images in a preferred viewing direction. The display has parallel, macroscopically planar, structured surface, non-light absorptive light deflecting and reflecting portions which are longitudinally symmetrical in mutually perpendicular directions, both of which are perpendicular to the preferred viewing direction. A liquid containing a plurality of movable members contacts the light reflecting portion. A controller applies an electromagnetic force to selectively move the members into an evanescent wave region adjacent the light reflecting portion to frustrate TIR of light rays at selected points on the light reflecting portion. The structured surfaces on the light deflecting portion deflect light rays incident in the preferred viewing direction toward the light reflecting portion by imparting to the rays a directional component in the direction of longitudinal symmetry of the light reflecting portion. The structured surfaces on the light reflecting portion totally internally reflect the deflected light rays toward the light deflecting portion at points other than the selected points at which TIR is frustrated. Then, the structured surfaces on the light deflecting portion again deflect the totally internally reflected light rays, cancelling the directional component therefrom, such that the deflected totally internally reflected light rays emerge from the display in a direction substantially parallel to the preferred viewing direction.

43 Claims, 8 Drawing Sheets

U.S. PATENT DOCUMENTS

| | | |
|---|---|---|
| 3,698,793 | 10/1972 | Tellerman . |
| 3,730,608 | 5/1973 | Castegnier . |
| 3,746,785 | 7/1973 | Goodrich . |
| 3,796,480 | 3/1974 | Preston, Jr. et al. . |
| 3,987,668 | 10/1976 | Popenoe . |
| 4,148,563 | 4/1979 | Herbert . |
| 4,165,155 | 8/1979 | Gordon, II et al. . |
| 4,218,302 | 8/1980 | Dalisa et al. . |
| 4,249,814 | 2/1981 | Hull et al. . |
| 4,324,456 | 4/1982 | Dalisa . |
| 4,391,490 | 7/1983 | Hartke . |
| 4,536,061 | 8/1985 | Nishimura . |
| 4,867,515 | 9/1989 | Normandin . |
| 5,045,847 | 9/1991 | Tarui et al. . |
| 5,099,343 | 3/1992 | Margerum et al. . |
| 5,128,782 | 7/1992 | Wood . |
| 5,221,987 | 6/1993 | Laughlin . |
| 5,283,148 | 2/1994 | Rao . |
| 5,301,009 | 4/1994 | Shurtz, II . |
| 5,317,667 | 5/1994 | Weber et al. . |
| 5,319,491 | 6/1994 | Selbrede . |
| 5,396,350 | 3/1995 | Beeson et al. . |
| 5,397,669 | 3/1995 | Rao . |
| 5,455,709 | 10/1995 | Dula, III et al. . |
| 5,530,053 | 6/1996 | Rao et al. . |
| 5,530,067 | 6/1996 | Rao et al. . |
| 5,555,327 | 9/1996 | Laughlin . |
| 5,555,558 | 9/1996 | Laughlin . |
| 5,561,541 | 10/1996 | Sharp et al. . |
| 5,566,260 | 10/1996 | Laughlin . |
| 5,598,280 | 1/1997 | Nishio et al. . |
| 5,608,837 | 3/1997 | Tai et al. . |
| 5,745,632 | 4/1998 | Dreyer . |
| 5,959,777 | 9/1999 | Whitehead . |
| 6,064,784 | 5/2000 | Whitehead et al. . |
| 6,172,798 * | 1/2001 | Albert .................................. 359/296 |

OTHER PUBLICATIONS

"Evanescent–wave scattering by electrophoretic microparticles: a mechanism for optical switching", Remillard et al, Applied Optics, vol.34, No.19, Jul. 1, 1995, pp.3777–3785.

"Subdivided Electrophoretic Display", Harbour et al, Xerox Disclosure Journal, vol.4, No.6, Nov. 1979, p. 705.

"Simplified Ray Tracing in Cylindrical Systems", L.A. Whitehead, Applied Optics, vol.21, No.19, pp.3536–3538, Oct. 1, 1982.

"Colloidal Refractometry: Meaning and Measurement of Refractive Index for Dispersions; The Science That Time Forgot", M. Mohammadi, Advances in Colloid and Interface Science 62 (1995) 17–29.

* cited by examiner

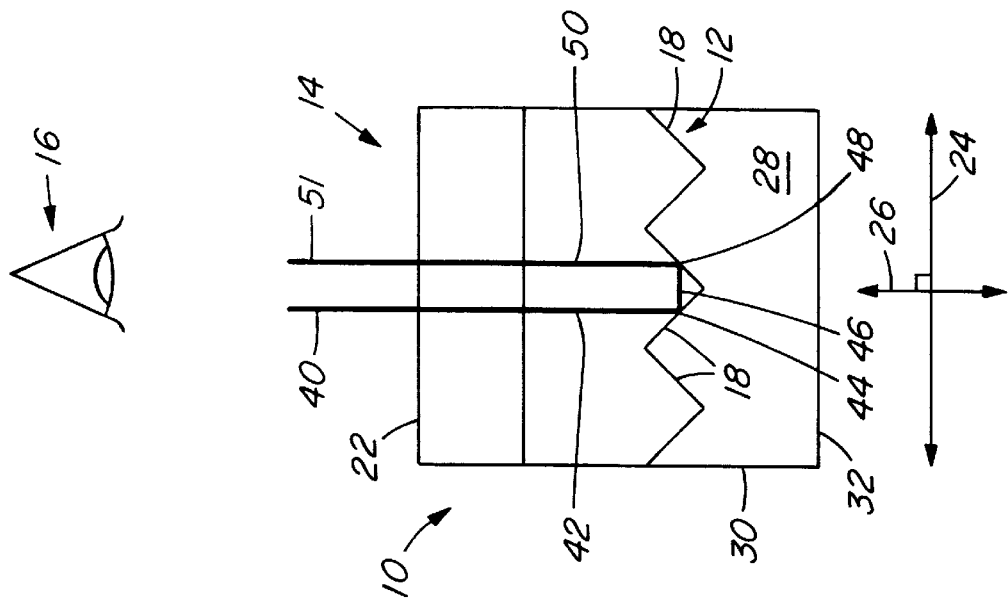
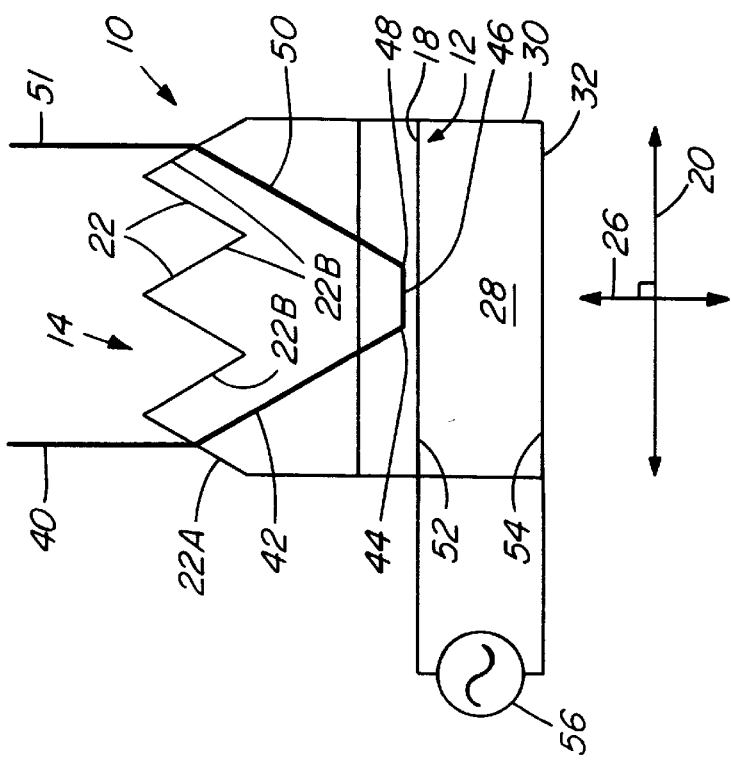

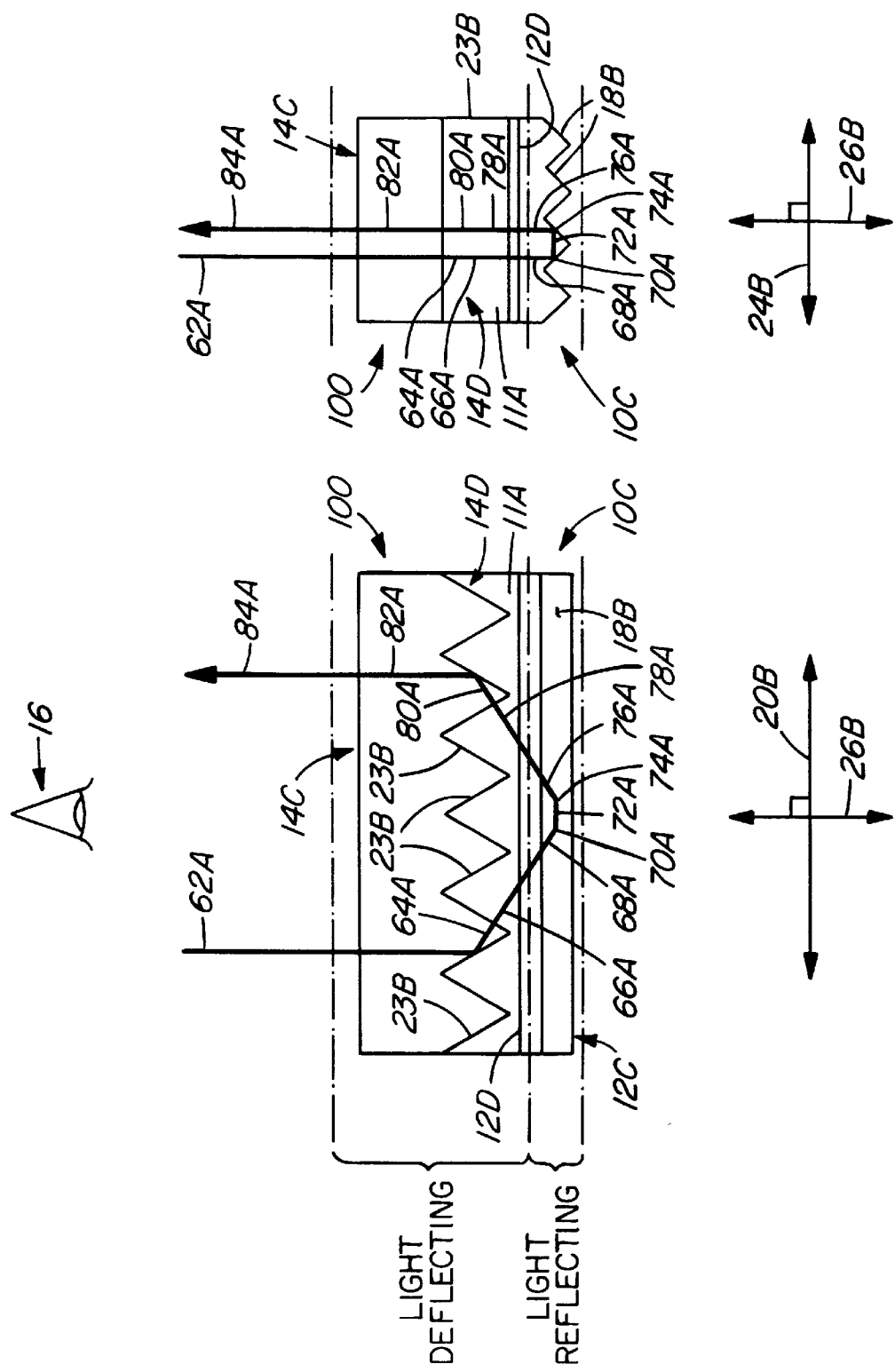

ENHANCED EFFECTIVE REFRACTIVE INDEX TOTAL INTERNAL REFLECTION IMAGE DISPLAY

TECHNICAL FIELD

A display device and method in which mutually perpendicularly aligned prismatic surfaces increase the display's effective refractive index, enhancing the display's ability to display information by controlled frustration of total internal reflection ("TIR").

BACKGROUND

It is well known that light travels at different speeds in different media. The change of speed results in refraction. Snell's law characterises the behaviour of a light ray which passes from one medium into another medium having a different index of refraction than the first medium. Specifically:

$$n_1 \sin\theta_1 = n_2 \sin\theta_2 \quad (1)$$

where, as shown in FIG. 1, $n_1$ is the index of refraction of the first medium, $n_2$ is the index of refraction of the second medium, $\theta_1$ is the angle of incidence (or refraction), within the first medium between the light ray and a normal vector to the interface between the two media, and $\theta_2$ is the angle of incidence (or refraction), within the second medium between the light ray and the normal.

As shown in FIG. 1, when light ray 10 passes from a higher refractive index medium such as glass, into a lower refractive index medium such as air, ray 10 is refracted away from normal 12. Conversely, if the direction of ray 10 is reversed, such that the ray passes from the lower index medium into the higher index medium, then the ray is refracted toward normal 12.

Thus, when ray 10 exits from the glass into the air, the refracted portion of ray 10 bends away from normal 12. The more the incident portion of ray 10 diverges from normal 12, the more the refracted portion of ray 10 diverges from the normal. Snell's law can be solved as follows to determine the angle $\theta_2$ at which the refracted portion of ray 10 exits from the glass into the air:

$$\theta_2 = \arcsin\left(\frac{n_1}{n_2}\sin\theta_1\right) \quad (2)$$

Sin $\theta_1$ increases as the incident portion of ray 10 within the glass diverges away from normal 12. The $n_1/n_2$ portion of the argument of the arcs in function exceeds 1 (i.e. for glass, $n_1 \approx 1.5$; and, for air $n_2 \approx 1$; so $n_1/n_2 \approx 1.5$). But the maximum value of the sine function is 1, so the arcs in function does not yield real values for arguments greater than 1. Consequently, if $n_1/n_2 \sin\theta_1 \geq 1$ there is no solution for the refracted angle $\theta_2$. In practice, TIR occurs if $n_{1/n2} \sin\theta_1 \geq 1$, under such circumstances, and the incident light ray is reflected back into the glass. The angle at which TIR first occurs as the refracted portion of ray 10 moves away from normal 12 is called the critical angle $\theta_c$, given by:

$$\theta_c = \arcsin\left(\frac{n_2}{n_1}\right) \quad (3)$$

Equation (3) shows that the size of the critical angle is related to the ratio of the two indices of refraction $n_1$, $n_2$. If the ratio of the two indices of refraction is relatively large, then the critical angle will be relatively small (i.e. closer to the normal) and vice versa. For purposes of the present invention, smaller critical angles (and hence a larger ratio of the two indices of refraction) are preferred, since they provide a larger range of angles within which TIR may occur. This means that more incident light can be reflected, and it is consequently possible to provide a display device having an improved range of viewing angles, and/or whiter appearance, both of which are desirable characteristics. It is thus apparent that $n_1$ is preferably as large as possible, and $n_2$ is preferably as small as possible.

It is well known that the incident portion of a light ray which undergoes TIR slightly penetrates the interface at which TIR occurs. This so-called "evanescent wave penetration" is of the order of about 0.25 micron for visible light. By interfering with (i.e. scattering and/or absorbing) the evanescent wave one may prevent or "frustrate" TIR. Specifically, one may frustrate TIR by changing the index of refraction in the vicinity of the evanescent wave. This can be accomplished by introducing into the evanescent wave a light absorptive material; or, by introducing into the evanescent wave a non-light absorptive material having an inhomogeneous refractive index. Inhomogeneity is important in the case of non-absorbent materials. For example, introduction of a homogeneous, finely dispersed particulate non-absorbent material into the evanescent wave would change the refractive index slightly to a value equivalent to that of the opposing medium. This would not prevent TIR, but would merely create an adjacent boundary layer at which TIR would occur.

As explained in U.S. Pat. No. 6,064,784 issued May, 16, 2000 an electrophoretic medium can be used to controllably frustrate TIR in an image display device employing prismatic reflective surfaces. "Electrophoresis" is a well known phenomenon whereby a charged species (i.e. particles, ions or molecules) moves through a medium due to the influence of an applied electric field. For purposes of the present invention, a preferred electrophoretic medium is Fluorinert™ Electronic Liquid FC-72 ($n \approx 1.25$) or FC-75 ($n \approx 1.27$) heat transfer media available from 3M, St. Paul, Minn. However, it is apparent that even this relatively low refractive index (i.e. compared to $n \approx 1.33$ for a typical organic solvent electrophoretic medium such as acetonitrile) is insufficient to attain a large refractive index ratio relative to conventional plastic media having refractive indices within the range of about 1.5 to 1.7 (such as polycarbonate, for which $n \approx 1.59$). In particular, the index ratio in such case is $n_2/n_1 = 1.59/1.27 \approx 1.25$, which corresponds to a relatively high critical angle of 53° required to achieve TIR at such an interface.

To achieve the desired high critical angle relative to a Fluorinert™ electrophoretic medium, the adjacent material (assumed to be a prismatic material bearing isosceles right angle prisms) must have a refractive index of at least $n_1 = \sqrt{2} \cdot n_2 = \sqrt{2} \cdot 1.27 \approx 1.8$, which is unachievable with inexpensive plastic materials. Indeed, the adjacent material's refractive index should preferably be about 2.0 to facilitate TIR of light rays which are incident upon the surface of the image display within a range of angles close to, but not precisely normal to the surface of the display. There are ceramic materials with refractive indices substantially greater than 1.8. However, it is difficult and expensive to micro replicate prismatic surfaces on such materials.

The present invention overcomes the foregoing difficulties.

SUMMARY OF INVENTION

The invention provides an image display for viewing images in a preferred viewing direction. The display has parallel, macroscopically planar, structured surface, non-light absorptive light deflecting and reflecting portions which are longitudinally symmetrical in mutually perpendicular directions, both of which are perpendicular to the preferred viewing direction. A liquid (preferably an electrophoretic medium) containing a plurality of movable members (preferably particles suspended in the medium) contacts the light reflecting portion. A controller applies an electromagnetic force to selectively (preferably electrophoretically) move the members into an evanescent wave region adjacent the light reflecting portion to frustrate TIR of light rays at selected points on the light reflecting portion. The structured surfaces on the light deflecting portion deflect light rays incident in the preferred viewing direction toward the light reflecting portion by imparting to the rays a directional component in the direction of longitudinal symmetry of the light reflecting portion. The structured surfaces on the light reflecting portion totally internally reflect the deflected light rays toward the light deflecting portion at points other than the selected points at which TIR is frustrated. Then, the structured surfaces on the light deflecting portion again deflect the totally internally reflected light rays, cancelling the directional component therefrom, such that the deflected totally internally reflected light rays emerge from the display in a direction substantially parallel to the preferred viewing direction.

The structured surfaces are preferably prismatic surfaces. In a first embodiment, the light deflecting portion is the outward surface of a sheet bearing a first plurality of prisms extending parallel to one another; and, the light reflecting portion is the sheet's inward surface bearing a second plurality of prisms extending parallel to one another and extending substantially perpendicular to the first plurality of prisms. The sheet is formed of a material having a refractive index greater than or equal to 1.6, preferably a composite polymer material having a refractive index of about 1.73. Advantageously, the electrophoretic medium has a refractive index of about 1.27, such as Fluorinert™ Electronic Liquid.

In a second embodiment, the light deflecting portion is: (i) a first sheet having an outward surface bearing a first plurality of prisms extending parallel to one another and having an opposed flat inward surface, (ii) the outward surface of a second sheet substantially parallel to the first sheet, the second sheet's outward surface bearing a second plurality of prisms extending parallel to one another and extending parallel to the first plurality of prisms, and (iii) an air gap between the first and second sheets. The second embodiment's light reflecting portion is a third plurality of prisms on the second sheet's inward surface, the third plurality of prisms extending parallel to one another and extending substantially perpendicular to the first and the second pluralities of prisms.

In a third embodiment, the light deflecting portion is: (i) a first sheet having a flat outward surface and having an opposed inward surface bearing a first plurality of prisms extending parallel to one another, (ii) the flat outward surface of a second sheet substantially parallel to the first sheet, and (iii) a gap between the first and second sheets containing a low refractive index medium. The third embodiment's light reflecting portion is a second plurality of prisms on the second sheet's inward surface, the second plurality of prisms extending parallel to one another and extending substantially perpendicular to the first plurality of prisms.

In a fourth embodiment, the light deflecting portion is a first sheet having a flat outward surface and an opposed inward surface bearing a first plurality of prisms extending parallel to one another; and, the light reflecting portion is a second sheet having a flat inward surface substantially parallel to the first sheet and having an opposed outward surface bearing a second plurality of prisms extending parallel to one another and extending substantially perpendicular to the first plurality of prisms. The fourth embodiment's light deflecting portion includes a gap between the first and second sheets containing a low refractive index medium.

In the second, third or fourth embodiments the sheets may be formed of a material having a refractive index greater than or equal to about 1.6 and the electrophoretic medium again has a refractive index of about 1.27, such as Fluorinert™ Electronic Liquid.

In the first embodiment, the first plurality of prisms are preferably 60° angle isosceles prisms and the second plurality of prisms are preferably right angle isosceles prisms. In the second embodiment, the first plurality of prisms are preferably isosceles prisms with apices subtending an angle θ which varies as a function of the refractive index of the first sheet, and the second and the third pluralities of prisms are preferably right angle isosceles prisms. In the third embodiment, the first plurality of prisms are preferably 60° isosceles prisms and the second plurality of prisms are preferably right angle isosceles prisms. In the fourth embodiment, the first and second pluralities of prisms are preferably 60° isosceles prisms.

In the third or fourth embodiments, the low refractive index medium preferably has a refractive index of less than or equal to about 1.27, such as Fluorinert™ Electronic Liquid.

BRIEF DESCRIPTION OF DRAWINGS

FIGS. 3A, 3B, and 3C are respectively cross-sectional front elevation, cross-sectional side elevation and top plan views, on a greatly enlarged scale, of the FIG. 2 apparatus, showing a light ray undergoing TIR.

FIGS. 8A and 8B are respectively cross-sectional side and end elevation views, on a greatly enlarged scale, of a portion of an image display in accordance with a further alternate embodiment of the invention having a light deflecting portion incorporating a low refractive index medium between opposed prismatic surfaces, and having a complementary light reflecting portion with a TIR interface between the inner prismatic surface and an electrophoretic medium.

DESCRIPTION

FIGS. 2 and 3A–3C depict a sheet 10 of reflective material having a refractive index which is preferably greater than 1.65 and ideally greater than or equal to 1.73. Although this is a moderately high refractive index, well above that of conventional plastics such as polycarbonate, for which n≈1.59, it is nonetheless attainable by using a high index composite polymer material, such as a suspension of sub-optical size zirconia particles in a transparent polymer, for which n≈1.73 has been experimentally achieved. More particularly, as discussed by Mohammadi in *Colloidal Refractometry: Meaning and Measurement of Refractive Index for Dispersions; The Science That Time Forgot*, Advances in Colloid and Interface Science 62 (1995) 17–29, it is well known that dispersions of high refractive index particles of sub-optical size in a lower refractive index medium behave optically like a homogeneous medium of intermediate refractive index, with the degree of index enhancement increasing with increasing concentration of the high refractive index particles.

Figure 1:
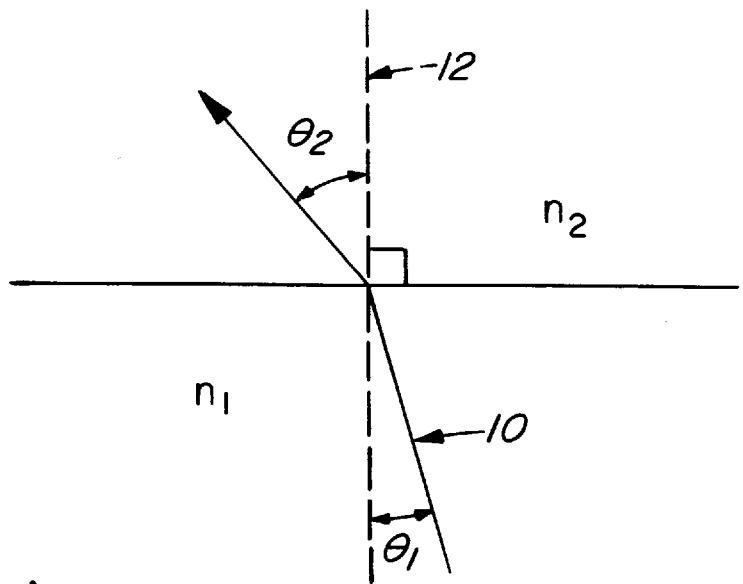
FIG. 1 schematically depicts a light ray undergoing refraction at a glass:air interface.
Figure 2:
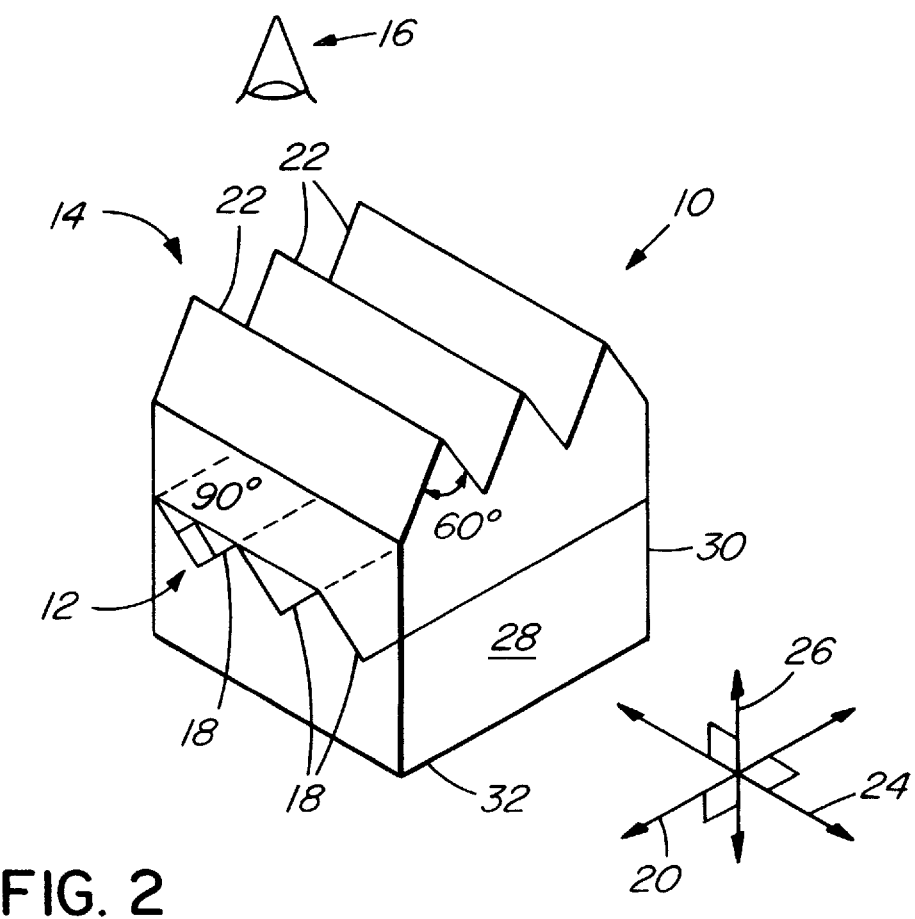
FIG. 2 is a pictorial illustration, on a greatly enlarged scale, of a portion of an image display in accordance with the invention incorporating a sheet of reflective material with mutually perpendicularly extending prisms on opposite sides, and showing the lower prismatic surface contacting an electrophoretic medium to achieve controllable frustration of total internal reflection ("TIR") at the "TIR interface" between the lower prismatic surface and the electrophoretic medium.

Sheet 10 forms an image display having inward and outward surfaces 12, 14. Viewer 16 observes the display through outward surface 14 in a preferred viewing direction substantially perpendicular to surfaces 12, 14. Inward surface 12 bears a large plurality of prisms 18 which extend parallel to one another in a first longitudinal direction 20. Outward surface 14 also bears a large plurality of prisms 22 which extend parallel to one another in a second longitudinal direction 24 substantially perpendicular to first longitudinal direction 20. Inward surface prisms 18 are preferably right angle isosceles prisms. That is, the inward facing apex of each inward surface prism 18 subtends a 90° angle, as shown in FIG. 2. Each face of each inward surface prism 18 is thus inclined at a 45° angle relative to a vector extending in a third direction 26 perpendicular to both of first and second longitudinal directions 20, 24. Outward surface prisms 22 are also preferably isosceles prisms, but not right angle isosceles prisms. Instead, the outward facing apex of each outward surface prism 22 preferably subtends a 60° angle, as shown in FIG. 2.

Prisms 18, 22 may be formed on opposed surfaces of sheet 10 by micro-machining an initially flat sheet to generate the prisms; or, by any one of a variety of known precision moulding techniques, with the mould itself being micro-machined into the desired negative shape. The prisms are large enough to be of reasonably high optical quality (i.e. the base of each prism is wider than about 10 μm), but small enough to be essentially invisible to the naked eye (i.e. the base of each prism is no more than about 250 μm wide). Sheet 10 is accordingly substantially planar on a macroscopic scale, and prismatic on a microscopic scale.

An electrophoresis medium 28 is maintained in contact with inward prismatic surface 12 by containment of medium 28 within a reservoir 30 defined by lower sheet 32. Electrophoresis medium 28 is preferably a low refractive index, low viscosity, electrically insulating liquid such as Fluorinert™ Electronic Liquid FC-72 (n≈1.25) or FC-75 (n≈1.27) heat transfer media available from 3M, St. Paul, Minn. A composite polymer:Fluorinert "TIR interface" is thus formed between prisms 18 and medium 28, assuming a high index composite polymer material is used to form sheet 10. Medium 28 contains a finely dispersed suspension of light scattering and/or light absorptive particles 34 (FIG. 4) such as dyed or otherwise scattering/absorptive silica particles (n≈1.44), dyed or otherwise scattering/absorptive latex particles (n≈1.5), etc. The optical characteristics of sheet 32 are relatively unimportant; sheet 32 need only form a reservoir for containment of electrophoresis medium 28 and particles 34.

As previously explained, a small critical angle is preferred at the TIR interface since this affords a large range of angles over which TIR may occur. The ratio of the index of refraction of a high index composite polymer material (n≈1.79) to that of Fluorinert yields a critical angle of about 47°, which is not small enough to achieve TIR for rays incident upon right angle isosceles prisms formed in the composite polymer:Fluorinert interface. However, the present invention makes it possible to achieve TIR at the composite polymer:Fluorinert interface, as is now explained.

Figure 3C:
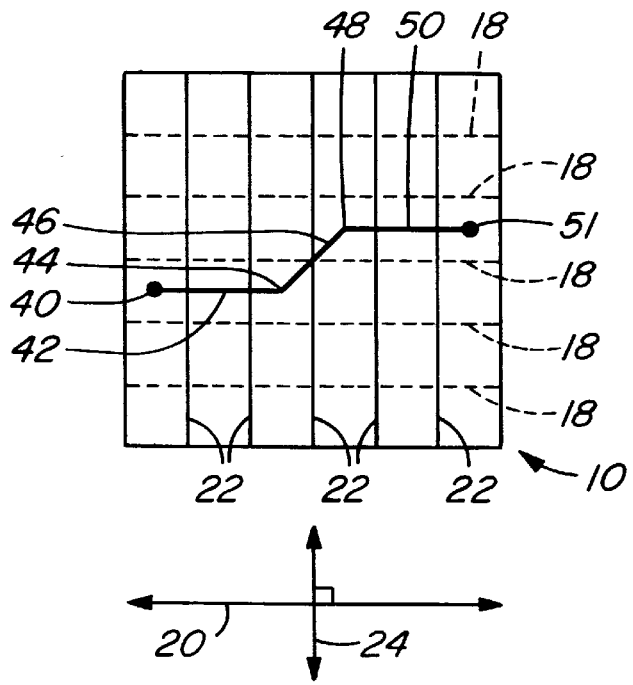

More particularly, incident light ray 40 encounters the air:composite polymer interface defined by a facet of one of outward prisms 22 at approximately a 60° incident angle, and is refracted by that prism toward inward prismatic surface 12, as shown at 42 in FIGS. 3A–3C and 4. For an air:composite polymer interface having refractive index ratio 1:1.73, the refraction angle is about 30°. Prior to refraction as aforesaid, ray 40 has substantially no component of travel in first longitudinal direction 20. The aforesaid refraction deflects the ray by imparting to it a component of travel in first longitudinal direction 20. It is known (see: L. A. Whitehead, *Simplified Ray Tracing in Cylindrical Systems*, Applied Optics, Vol. 21, No. 19, pp. 3536–3538, Oct. 1, 1982) that such refraction increases the effective refractive index of sheet 10 (the addition of a component of travel in a longitudinal direction within a translationally symmetrical system increases the effective refractive index with respect to the translational motion of the rays). In particular, if incident light ray 40 is deflected 30° away from the incident normal direction, as shown in FIG. 3A, then TIR will occur at the composite polymer:Fluorinert interface if the refractive index ratio of sheet 10 relative to electrophoresis medium 28 is 1.64, which is considerably less than the value of 1.8 which would otherwise be required, as explained above. Refracted ray 42 thus encounters a first face on one of inward prisms 18 at the TIR interface, as shown at 44, at an angle which substantially exceeds the TIR interface's 47° critical angle and is totally internally reflected as ray 46. As best seen in FIG. 3C, ray 46 is reflected at an angle with respect to both of longitudinal directions 20, 24. Reflected ray 46 then encounters a second face on an adjacent one of inward prisms 18, opposite the first prism face, as shown at 48, and again undergoes TIR at the second prism face, because its incident angle substantially exceeds the TIR interface's 47° critical angle. After twice undergoing TIR at retro-reflective inward prismatic surface 12 as aforesaid, the retro-reflected ray 50 is refracted through the composite polymer:air interface and emerges, as illustrated at 51, in a direction nearly 180° opposite to the direction of the original incident ray 40 (i.e. in a direction substantially parallel to the preferred viewing direction), thus achieving a "white" appearance in the reflected light.

It can be seen that the FIG. 2 apparatus has complementary light deflecting and light reflecting characteristics. Outward prisms 22 constitute a "light deflecting" portion of the display; and, the TIR interface between inward prisms 18 and medium 28 with respect to which particles 34 are electrophoretically moved as explained below constitutes a "light reflecting" portion of the display. The "light deflecting" portion deflects light rays of near-normal incidence such that the rays acquire a component of travel in a direction of "longitudinal symmetry". An object has longitudinal symmetry in a particular direction if the object's cross-sectional shape in a plane perpendicular to such direction is translationally invariant in such direction. At any point on any surface of a longitudinally symmetrical object, the normal vector to the surface is perpendicular to the object's direction of longitudinal symmetry. As described in Whitehead, supra, it is possible to accurately model the propagation of a light ray in the cross-sectional plane of a longitudinally symmetrical object, accounting for the ray's motion in the longitudinal direction with mathematical precision, by assigning an effective refractive index (determined by the degree of motion in the longitudinal direction) to the various materials which form the object. Thus, inward prisms 18 have longitudinal symmetry in first longitudinal direction 20, and outward prisms 22 have longitudinal symmetry in second longitudinal direction 24. Prisms 22 initially deflect near-normal incident ray 40 toward first longitudinal direction 20 (i.e. refracted ray 42 has a directional component parallel to first longitudinal direction 20, as seen in FIG. 3C), which is the direction of longitudinal symmetry of prisms 18. This increases the effective refractive index of prisms 18 as aforesaid, making it easier to attain TIR at points 44, 46 as explained above. After twice undergoing TIR as aforesaid, retro-reflected ray 50 is again deflected by prisms 22 in the direction of longitudinal symmetry of prisms 18, precisely cancelling or removing the effect of the initial deflection and allowing ray 51 to emerge in a direction nearly 180° opposite to the direction of the original incident ray 40.

Figure 4:
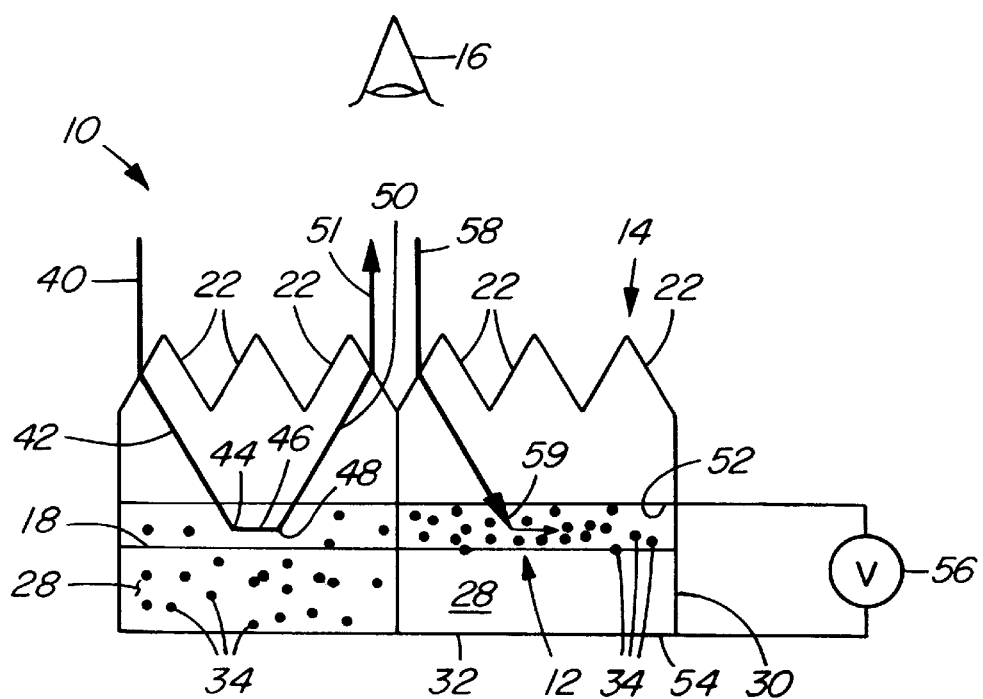
FIG. 4 is similar to FIG. 3A and shows electrophoretic movement of particles through the electrophoretic medium of the FIG. 2 apparatus to modify the optical characteristics of the apparatus at the TIR interface. The left side of FIG. 4 shows no electrophoretic activity, such that light rays incident upon the TIR interface undergo TIR. The right side of FIG. 4 shows the particles electrophoretically moved to the TIR interface, frustrating TIR such that light incident upon the TIR interface does not undergo TIR.

As shown in FIG. 4, a voltage can be applied across electrophoresis medium 28 via electrodes 52, 54 which are respectively deposited on surfaces 12, 32. Electrode 52 is transparent and substantially thin such that it does not interfere with incident rays at the TIR interface. Electrode 54 need not be transparent. If electrophoresis medium 28 is activated by actuating voltage source 56 to apply a voltage across medium 28, as is illustrated for the right half of medium 28 depicted in FIG. 4, suspended particles 34 are electrophoretically moved to within about 0.25 micron of the TIR interface (i.e. inside the evanescent wave region adjacent inward prismatic surface 12). When electrophoretically moved as aforesaid, particles 34 scatter or absorb light, thus preventing TIR at the surfaces of prisms 18. This is illustrated by light ray 58 in FIG. 4, which is scattered and/or absorbed as it strikes particles 34 inside the evanescent wave region at the TIR interface, as shown at 59, thus achieving a "dark" appearance in the non-reflective scattering/absorption region. Reversal of the polarity of the applied voltage electrophoretically moves particles 34 out of the evanescent wave region, thus restoring a "white" appearance.

The optical characteristics of inward prismatic surface 12 can be controlled by switchably controlling the voltage applied across medium 28 via electrodes 52, 54. For example, electrodes 52, 54 can be segmented to control electrophoretic particulate intrusion within the evanescent wave region adjacent at different points on surface 12. Particular segments of electrodes 52, 54 applied to selected points on surface 12 can be actuated to move particles 34 into or out of the evanescent wave region adjacent surface 12 at such points, with each point thus constituting a switchable "pixel", and all of the pixels collectively forming a display.

Besides having the desired low refractive index, Fluorinerts are also well suited to use in displays formed in accordance with the invention because they are good electrical insulators, and they are inert. Fluorinerts also have low viscosity and high density, so particles suspended in Fluorinerts can be moved electrophoretically relatively easily. As noted above, a high index composite polymer material is a preferred high refractive index material suitable for use in forming sheet 10. The sheet is preferably optically clear and has a high refractive index which is preferably greater than or equal to 1.6 in the range of visible wavelengths of light. By "optically clear", it is meant that a substantial fraction of light incident on the material at normal incidence will pass through a selected thickness of the material, with only a small fraction of such light being scattered and/or absorbed by the material. Diminished optical clarity is caused by such scattering and/or absorption, typically a combination of both, as the light passes through the material. Sheet 10 need only be approximately 10 microns thick. A material which is "opaque" in bulk form may nevertheless be "optically clear" for purposes of the present invention, if a 10 micron thickness of such material scatters and/or absorbs only a small fraction of normal incident light. High index composite polymer material is also well suited to use in displays formed in accordance with the invention because it has low absorption/scattering characteristics and consequently high optical clarity in the aforementioned wavelength range. Further, high index composite polymer material can be moulded to yield the desired retro-reflective microstructure as explained above.

Application of a voltage across medium 28 by means of electrodes 52, 54 and voltage source 56 applies an electrostatic force to particles 34, causing them to move into the evanescent wave region as aforesaid. When particles 34 move into the evanescent wave region they must be capable of frustrating TIR at the TIR interface, by scattering and/or absorbing the evanescent wave. Although particles 34 may be as large as one micron in diameter, the particles' diameter is preferably significantly sub-optical (i.e. an order of magnitude smaller than one micron, say 100 nm in diameter) such that a monolayer of particles at the TIR interface entirely fills the evanescent wave region. Useful results are obtained if the diameter of particles 34 is about one micron, but the display's contrast ratio is reduced because the ability of particles 34 to pack closely together at the TIR interface is limited by their diameter. More particularly, near the critical angle, the evanescent wave extends quite far into medium 28, so particles having a diameter of about one micron are able to scatter and/or absorb the wave and thereby frustrate TIR. But, as the angle at which incident light rays strike the TIR interface increases relative to the critical angle, the depth of the evanescent wave region decreases significantly. Relatively large (i.e. one micron) diameter particles cannot be packed as closely into this reduced depth region and accordingly such particles are unable to frustrate TIR to the desired extent. Smaller diameter (i.e. 100 nm) particles can however be closely packed into this reduced depth region and accordingly such particles are able to frustrate TIR for incident light rays which strike the TIR interface at angles exceeding the critical angle.

Mechanical frustration of TIR (i.e. by moving an elastomeric sheet into and out of the evanescent wave region as disclosed in U.S. Pat. No. 5,959,777 issued Sep. 28, 1999) is best accomplished at a flat surface, since it is easier to achieve optical contact at a flat surface. It is comparatively difficult to mechanically frustrate TIR at a prismatic surface, due to the difficulty in attaining the required alignment accuracy between the prismatic surface and the part which is to be mechanically moved into and out of optical contact with the prismatic surface. However, electrophoretic medium 28 easily flows to surround retroreflective inward prismatic surface 12, thus eliminating the alignment difficulty and rendering practical the usage of a prismatic micro-structured surface as the TIR interface.

An important feature of the 60° angle of outward prisms 22, combined with the 1.73 refractive index of sheet 10, is that, as shown in FIG. 3A, incident light ray 40 is refracted by one of the facets 22A of one of prisms 22 such that the refracted ray 42 is substantially parallel to the oppositely angled prism facets 22B. Accordingly, very little of the light represented by refracted ray 42 is lost due to interaction with the oppositely angled prism facets 22B. Moreover, any dispersion of refracted ray 42 is cancelled or removed by subsequent refraction of retro-reflected ray 50. Another advantage is that two TIR reflections occur (i.e. at 44 and 30 48, as previously explained) which reduces the amount of light absorption needed at each reflection at the facets of prisms 18 to achieve the desired contrast ratio.

In general, the invention juxtaposes a light deflecting optical system having longitudinal symmetry in one direction, with a light reflecting optical system having longitudinal symmetry in a perpendicular direction. The two longitudinal symmetry directions are mutually perpendicular to a third direction of preferred viewing, which is itself perpendicular to the macroscopically planar, microscopically structured surface, parallel, sheet materials comprising the two optical systems. The embodiment of FIGS. 2–4 is but one specific example of a wide range of possible embodiments conforming to the foregoing general characterization of the invention. The embodiment of FIGS. 2–4 can operate with high optical efficiency and yield TIR in the reflecting system which is amenable to electrophoretic or other suitable electromagnetic control, but these desirable features are not essential attributes of the invention in its most general form. To further illustrate the generality of the invention, it is useful to consider several alternative embodiments which have various advantages and disadvantages relative to the embodiment of FIGS. 2–4.

Figure 5:
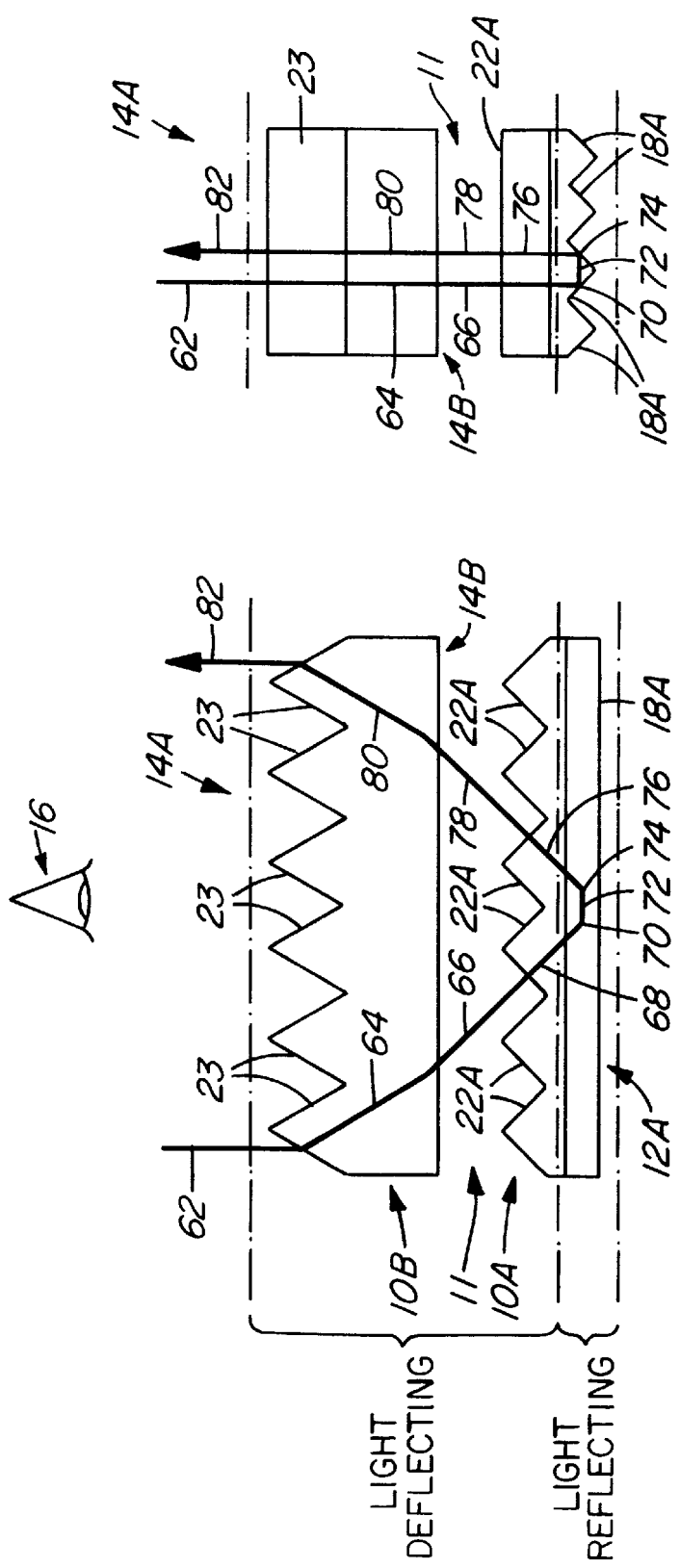
FIGS. 5A and 5B are respectively cross-sectional side and end elevation views, on a greatly enlarged scale, of a portion of an image display in accordance with an alternate embodiment of the invention having a light deflecting portion incorporating an air gap between two outwardly directed parallel prismatic surfaces, and having a complementary light reflecting portion with a TIR interface between an inwardly directed prismatic surface and an electrophoretic medium.

FIGS. 5A and 5B depict one such an alternate embodiment of the invention in which inward and outward polymer sheets 10A, 10B are separated by an air gap 11 to form an image display for viewing by viewer 16. Inward surface 12A of inward or "first" sheet 10A bears a large plurality of inwardly directed prisms 18A which extend parallel to one another in first longitudinal direction 20A. The opposed, outward surface of inward sheet 10A bears a large plurality of outwardly directed prisms 22A which extend parallel to one another in second longitudinal direction 24A, substantially perpendicular to first longitudinal direction 20A. Prisms 18A and prisms 22A are preferably right angle isosceles prisms. That is, the inward facing apex of each prism 18A subtends a 90° angle, and the outward facing apex of each prism 22A also subtends a 90° angle. Each face of each prism 18A is thus inclined at a 45° angle relative to a vector extending in a third longitudinal direction 26A perpendicular to both first and second longitudinal directions 20A, 24A; and, each face of each prism 22A is also inclined at a 45° angle relative to the same vector.

Outward surface 14A of outward or "second" sheet 10B bears a large plurality of outwardly directed prisms 23 which extend parallel to one another in second longitudinal direction 24A, substantially parallel to prisms 22A. The inward surface 14B of sheet 10B is flat. Prisms 23 are preferably isosceles prisms, but not right angle isosceles prisms. Instead, the outward facing apex of each one of prisms 23 preferably subtends an angle θ, as described below with reference to FIGS. 6 and 7. As previously explained, all of the prisms need to be large enough to be of reasonably high optical quality (i.e. the base of each prism is wider than about 10 μm), but small enough to be essentially invisible to the naked eye (i.e. the base of each prism is no more than about 250 μm wide). An electrophoresis medium containing a finely dispersed suspension of light scattering and/or absorptive particles (not shown in FIGS. 5A–5B) is maintained in contact with inward prismatic surface 12A. Electrodes (not shown) and a voltage source (not shown) are provided, as previously described in relation to FIG. 4, to controllably electrophoretically move the particles within the electrophoretic medium to selectably frustrate TIR at the interface between the electrophoretic medium and prismatic surface 12A.

Although the FIGS. 5A–5B embodiment is more complex than the embodiment of FIGS. 2–4 and is even more susceptible to undesirable partial reflections at internal interfaces, the FIGS. 5A–5B embodiment has the advantage that it may be constructed with lower refractive index polymer materials (i.e. n≈1.6). Specifically, the FIGS. 5A–5B embodiment has a greater increase of effective refractive index relative to that of the FIGS. 2–4 embodiment. This can be understood by considering the path of a typical light ray. Incident light ray 62 encounters the air:polymer interface defined by one facet of one of prisms 23 at approximately a 62° angle, and is refracted toward flat inward surface 14B such that the refracted ray 64 is substantially parallel to the oppositely angled facets of prisms 23. Accordingly, very little of the light represented by refracted ray 64 is lost due to interaction with the oppositely angled facets of prisms 23. Upon emergence through surface 14B into air gap 11, ray 64 is further refracted at approximately a 45° angle, as ray 66, such that the further refracted ray 66 is substantially perpendicular to the leftward (as viewed in FIG. 5A) facets of prisms 22A and substantially parallel to the oppositely angled (i.e. rightward, as viewed in FIG. 5A) facets of prisms 22A. Accordingly, ray 66 strikes one of the facets of prisms 22A substantially perpendicularly and is thus minimally refracted at the air:polymer interface between air gap 11 and sheet 10A, passing into sheet 10A as ray 68, substantially parallel to the oppositely angled facets of prisms 22A. Ray 68 has a substantial component in the longitudinal symmetry direction 20A of prisms 18A, thus increasing the effective refractive index of sheet 10A as previously explained. Note that ray 68 is inclined only 45° away from direction 20A, whereas the equivalent angle is 60° in the embodiment of FIGS. 2–4, and thus the refractive index enhancement effect in this case is greater, allowing sheets 10A, 10B to be formed of a (non-composite) polymer material having a refractive index as low as 1.6. That is, TIR will occur at the polymer:Fluorinert interface at inward surface 12A if the refractive index ratio of sheet 10A relative to the electrophoresis medium is 1.6, which is considerably less than the value of 1.7 which would otherwise be required, as explained above. Refracted ray 68 thus encounters a first face on one of inward prisms 18A at the TIR interface, as shown at 70, at an angle which exceeds the TIR interface's critical angle (53° for a polymer of refractive index 1.59 relative to Fluorinert™ Electronic Liquid FC-75 of refractive index 1.27) and is totally internally reflected as shown at 72. Reflected ray 72 then encounters a second face on an adjacent one of inward prisms 18A, opposite the first prism face, as shown at 74, and again undergoes TIR at the second prism face, because the angle at which reflected ray 72 encounters the second prism face exceeds the TIR interface's 53° critical angle. After twice undergoing TIR at retro-reflective inward prismatic surface 12A as aforesaid, the retro-reflected ray 76 is directed substantially perpendicular to the rightward (as viewed in FIG. 5A) facets of prisms 22A and substantially parallel to the oppositely angled (i.e. leftward, as viewed in FIG. 5A) facets of prisms 22A. Accordingly, ray 76 strikes one of the facets of prisms 22A substantially perpendicularly and is thus minimally refracted at the polymer:air interface between sheet 10A and air gap 11, passing into air gap 11 as ray 78.

Ray 78 encounters the air:polymer interface at flat surface 14B at approximately a 45° angle, and is refracted toward prisms 23 such that the refracted ray 80 is substantially parallel to the leftward (as viewed in FIG. 5A) facets of prisms 23 and substantially perpendicular to the oppositely angled (i.e. rightward, as viewed in FIG. 5A) facets of prisms 23. Accordingly, very little of the light represented by refracted ray 80 is lost due to interaction with the oppositely angled facets of prisms 23. Ray 80 is re-emitted through the polymer:air interface and emerges, as illustrated at 82, in a direction nearly 180° opposite to the direction of the original incident ray 62, thus achieving a "white" appearance in the reflected light.

The FIG. 5A–5B apparatus, like that of FIGS. 2–4, has complementary light deflecting and light reflecting characteristics. Prisms 23, inward surface 14B, and prisms 22A together constitute the "light deflecting" portion of the display; and, the TIR interface between inward prismatic surface 12A and the electrophoretic medium constitutes the "light reflecting" portion of the display. The light deflecting portion deflects light rays of near-normal incidence such that they acquire a substantial directional component in the direction of longitudinal symmetry of the reflecting portion of the display. Specifically, the combined effect of prisms 23, inward surface 14B, and prisms 22A is to deflect near-normal normal incident rays toward the direction of longitudinal symmetry of prisms 18A, increasing the effective refractive index of sheet 10A and making it easier to attain TIR at points 70, 74. After twice undergoing TIR as aforesaid, retro-reflected ray 76 is again deflected by prisms 22A and 23 in the direction of longitudinal symmetry of prisms 18A, precisely cancelling or removing the effect of the initial deflection and allowing ray 82 to emerge in a direction nearly 180° opposite to the direction of the original incident ray 62.

Figure 6:
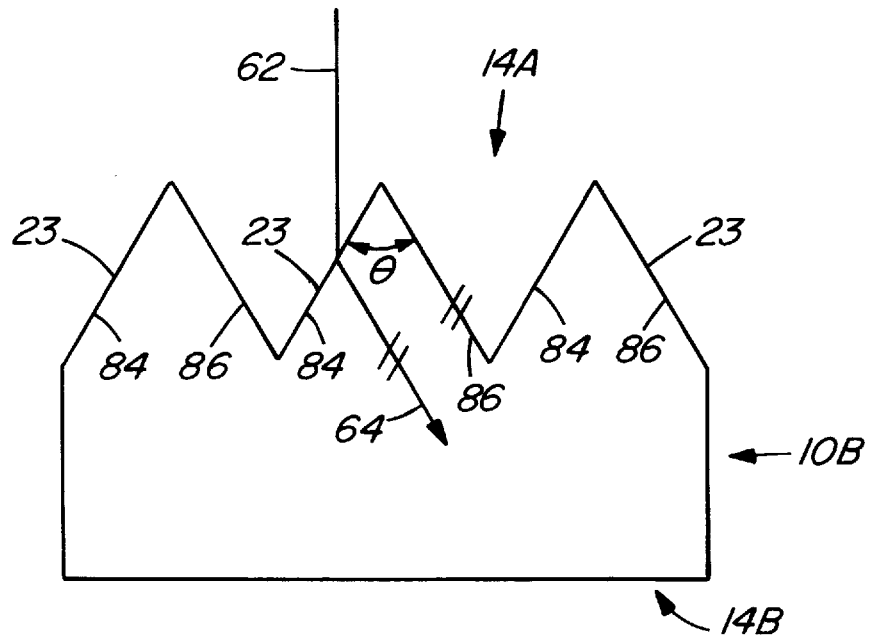
FIG. 6 is a cross-sectional front elevation view, on a greatly enlarged scale, depicting a preferred prism structure for the upper prismatic surface of the FIGS. 5A–5B apparatus.
Figure 7:
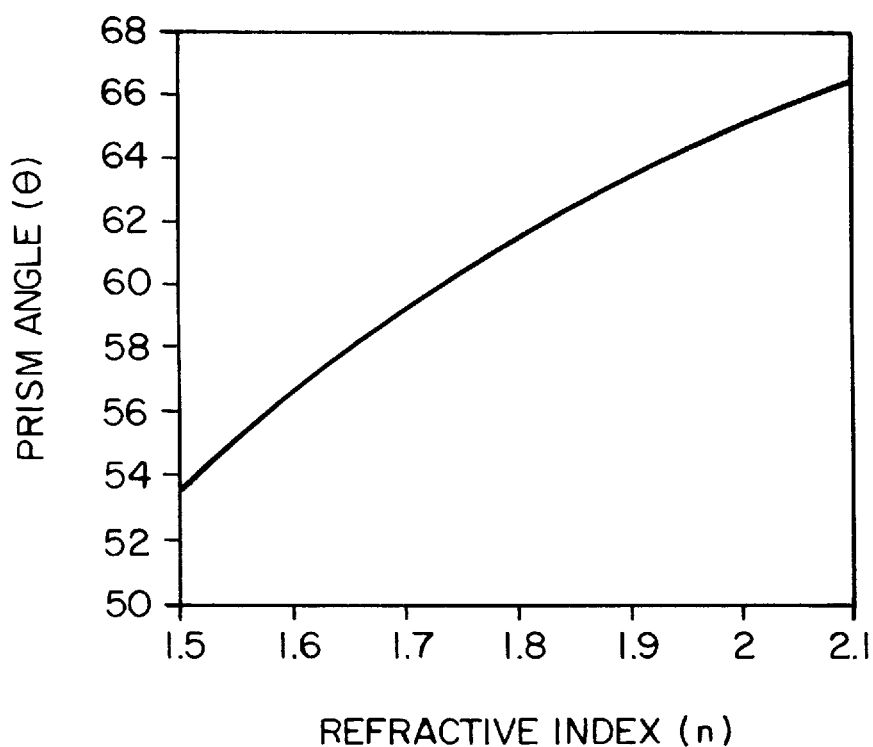
FIG. 7 is a graph which plots the preferred value of the isosceles prism angle θ shown in FIG. 6 as a function of the index of refraction n of the material used to form the upper prismatic surface of the FIGS. 5A–5B apparatus.

As shown in FIG. 6, the outward facing apex of each one of prisms 23 subtends an angle θ between oppositely angled prism facets 84, 86. θ is selected as a function of the refractive index of the material from which sheet 10B is formed such that a normal or near-normal incident light ray 62 striking one of facets 84 is refracted (i.e. as ray 64) substantially parallel to the oppositely angled facets 86. Accordingly, very little of the light represented by refracted ray 64 is lost due to interaction with the oppositely angled facets 86. FIG. 7 illustrates dependence of θ upon refractive index. For example, if sheet 10B is made from a composite polymer material having refractive index n≈1.73 then θ is preferably about 60°, but if sheet 10B is made from a non-composite polymer material having refractive index n≈1.59 then θ is preferably about 56°.

FIGS. 8A–8B depict a further alternative embodiment of the invention, in which inward and outward non-composite polymer sheets 10C, 10D are separated by a fluidic gap 11A to form an image display for viewing by viewer 16. Inward surface 12C of inward or "first" sheet 10C bears a large plurality of inwardly directed prisms 18B which extend parallel to one another in first longitudinal direction 20B. The opposed, outward surface 12D of inward sheet 10C is flat. Inward surface 14D of outward or "second" sheet 10D bears a large plurality of inwardly directed prisms 23B which extend parallel to one another in second longitudinal direction 24B, perpendicular to prisms 18B. The opposed, outward surface 14C of sheet 10D is flat. A low refractive index medium such as Fluorinert™ Electronic Liquid (n≈1.27) is maintained in gap 11A between prismatic surfaces 12D, 14D. Provision of a low refractive index medium in gap 11A reduces the extent to which light rays entering inward sheet 10C are refracted, thus maintaining a high effective refractive index for inward sheet 10C.

Prisms 18B are preferably right angle isosceles prisms. That is, the inward facing apex of each prism 18B subtends a 90° angle. Each face of each prism 18B is thus inclined at a 45° angle relative to a vector extending in a third longitudinal direction 26B perpendicular to both first and second longitudinal directions 20B, 24B. Prisms 23B are preferably 60° isosceles prisms. That is, the inward facing apex of each one of prisms 23B preferably subtends a 60° angle. Each face of each prism 23B is thus inclined at a 30° angle relative to the aforementioned vector extending in third longitudinal direction 26B. As previously explained, all of the prisms need to be large enough to be of reasonably high optical quality (i.e. the base of each prism is wider than about 10 μm), but small enough to be essentially invisible to the naked eye (i.e. the base of each prism is no more than about 250 μm wide).

An electrophoresis medium such as Fluorinert™ Electronic Liquid (n≈1.27) containing a finely dispersed suspension of light scattering and/or absorptive particles (not shown in FIGS. 8A–8B) is maintained in contact with inward prismatic surface 12C. Electrodes (not shown) and a voltage source (not shown) are provided, as previously described in relation to FIG. 4, to controllably electrophoretically move the particles within the electrophoretic medium to selectably frustrate TIR at the interface between the electrophoretic medium and prismatic surface 12C.

The FIGS. 8A–8B embodiment is again more complex than the embodiment of FIGS. 2–4 and is susceptible to partial internal reflections at the internal interfaces. However, like the FIGS. 5A–5B embodiment, the FIGS. 8A–8B embodiment has the advantage that it may be constructed with non-composite, lower refractive index polymer materials (i.e. n≈1.59) since the FIGS. 8A–8B embodiment has a greater increase of effective refractive index relative to that of the FIGS. 2–4 embodiment. This can be understood by considering the path of a typical light ray. Incident light ray 62A passes through the flat outward surface 14C of outward sheet 10D, undergoes TIR at the polymer:Fluorinert interface defined by one facet of one of prisms 23B, and is reflected as ray 64A substantially perpendicularly to that prism's oppositely angled facet. Accordingly, ray 64A is minimally refracted at the polymer:Fluorinert interface between sheet 10D and fluidic gap 11A, passing into gap 11A as ray 66A. Ray 66A has a substantial component in the longitudinal symmetry direction 20B of prisms 18B, thus increasing the effective refractive index of sheet 10C as previously explained.

Ray 66A passes through fluidic gap 11A, encounters the flat outward surface 12D of sheet 10C at approximately a 60° angle, and passes into sheet 10C, with some refraction, as ray 68A. Note that ray 68A is inclined only 43° away from direction 20B, whereas the equivalent angle is 60° in the embodiment of FIGS. 2–4, and thus the refractive index enhancement effect in this case is greater, allowing sheets 10C, 10D to be formed of a (non-composite) polymer material having a refractive index as low as 1.6. That is, TIR will occur at the Fluorinert:polymer interface at inward surface 12C if the refractive index ratio of sheet 10C relative to the fluid in gap 11A is 1.6, which is considerably less than the value of 1.7 which would otherwise be required, as explained above. Ray 68A thus encounters a first face on one of inward prisms 18B at the TIR interface, as shown at 70A, at an angle which exceeds the TIR interface's critical angle (53° for a polymer of refractive index 1.59 relative to Fluorinert™ Electronic Liquid FC-75 of refractive index 1.27) and is totally internally reflected as shown at 72A. Reflected ray 72A then encounters a second face on an adjacent one of inward prisms 18B, opposite the first prism face, as shown at 74A, and again undergoes TIR at the second prism face, because the angle at which reflected ray 72A encounters the second prism face exceeds the TIR interface's 53° critical angle. After twice undergoing TIR at retro-reflective inward prismatic surface 12C as aforesaid, the retro-reflected ray 76A encounters the flat outward surface of sheet 10C at approximately a 43° angle and passes into fluidic gap 11A, with some refraction, as ray 78A. Ray 78A is thus directed substantially perpendicular to the leftward (as viewed in FIG. 8A) facets of prisms 23B. Accordingly, ray 78A strikes one of the facets of one of prisms 23B substantially perpendicularly and is thus minimally refracted at the Fluorinert:polymer interface between gap 11A and sheet 10D, passing into sheet 10D as ray 80A. Ray 80A then undergoes TIR at the oppositely angled (i.e. rightward, as viewed in FIG. 8A) facet of that prism 23B, where it is further reflected as illustrated at 82A and then encounters the flat outward surface of sheet 10C at approximately a 90° angle and thus emerges from sheet 10C as ray 84A without further refraction and in a direction nearly 180° opposite to the direction of the original incident ray 62A, thus achieving a "white" appearance in the reflected light.

The FIG. 8A–8B apparatus, like those of FIGS. 2–4 and 5A–5B, has complementary light deflecting and light reflecting characteristics. Flat outward surface 14C of outward sheet 10D, prisms 23B, fluidic gap 11A, and flat outward surface 12D of inward sheet 10C together constitute the "light deflecting" portion of the display; and, the TIR interface between fluidic gap 11A and prisms 18B constitutes the "light reflecting" portion of the display. The light deflecting portion deflects light rays of near-normal incidence such they have a substantial component in the direction of longitudinal symmetry of the reflecting portion of the display. Specifically, the combined effect of surface 14C, prisms 23B, fluidic gap 11A, and surface 12D is to deflect near-normal incident rays toward the direction of longitudinal symmetry of prisms 18B, increasing the effective refractive index of sheet 10C and making it easier to attain TIR at points 70A, 74A. After twice undergoing TIR as aforesaid, retro-reflected ray 76A is again deflected by prisms 23B in the direction of longitudinal symmetry of prisms 18B, precisely cancelling or removing the effect of the initial deflection and allowing ray 84A to emerge in a direction nearly 180° opposite to the direction of the original incident ray 62A.

The FIGS. 8A–8B embodiment achieves high optical efficiency through the use of 60° prisms 23B, in that all of the light rays undergo TIR as described without encountering surfaces which would deflect the rays away from the preferred path described above. A further advantage is that flat outward surface 14C of the FIGS. 8A–8B embodiment is easier to maintain than prismatic outward surfaces 14 or 14A of the embodiments of FIGS. 2–4 and 5A–5B. A disadvantage of the FIGS. 8A–8B embodiment is that it requires two separate sheets (10C, 10D) of material bounding a lower index material which at present appears to be available only in liquid form. Nevertheless, the FIGS. 8A–8B embodiment achieves TIR over a wide range of angles with lower refractive index materials than the embodiment of FIGS. 2–4.

Figure 9B:
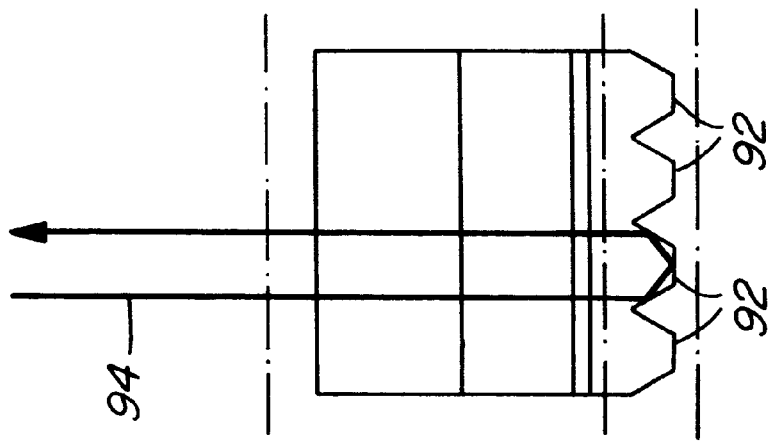
FIGS. 9A, 9B, 9C and 9D are similar to FIG. 8B, and show image displays with light reflecting structures respectively having right angle isosceles prism (FIG. 9A), trapezoidal (FIG. 9B), parabolic (FIG. 9C) and 60° isosceles prism (FIG. 9D) shapes.
Figure 9A:
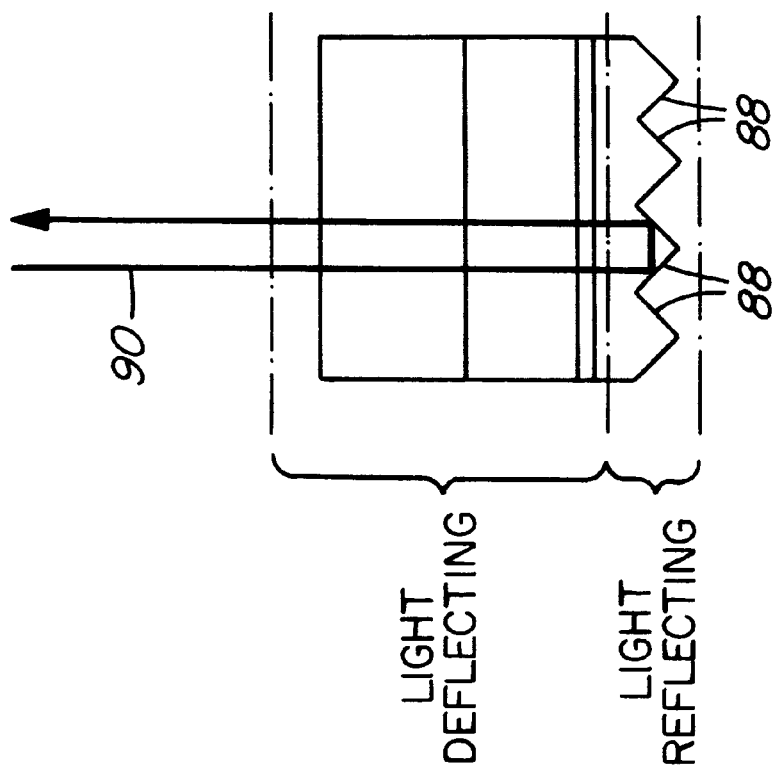
Figure 9D:
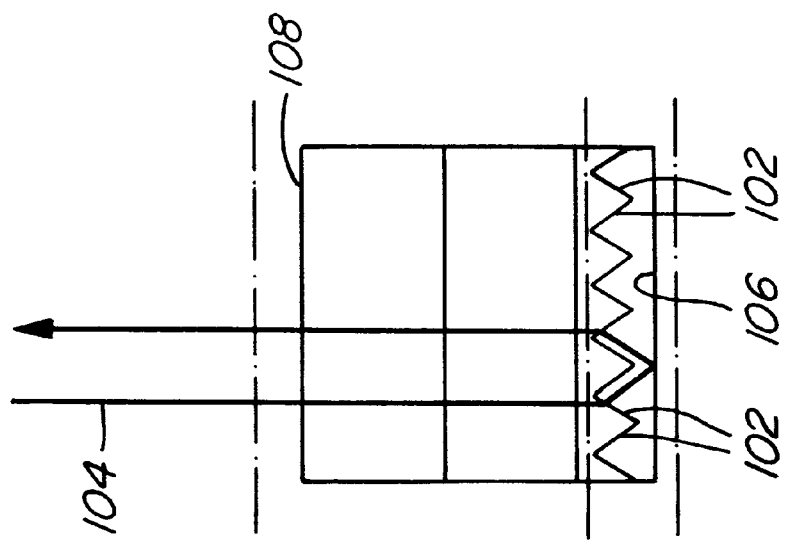
Figure 9C:
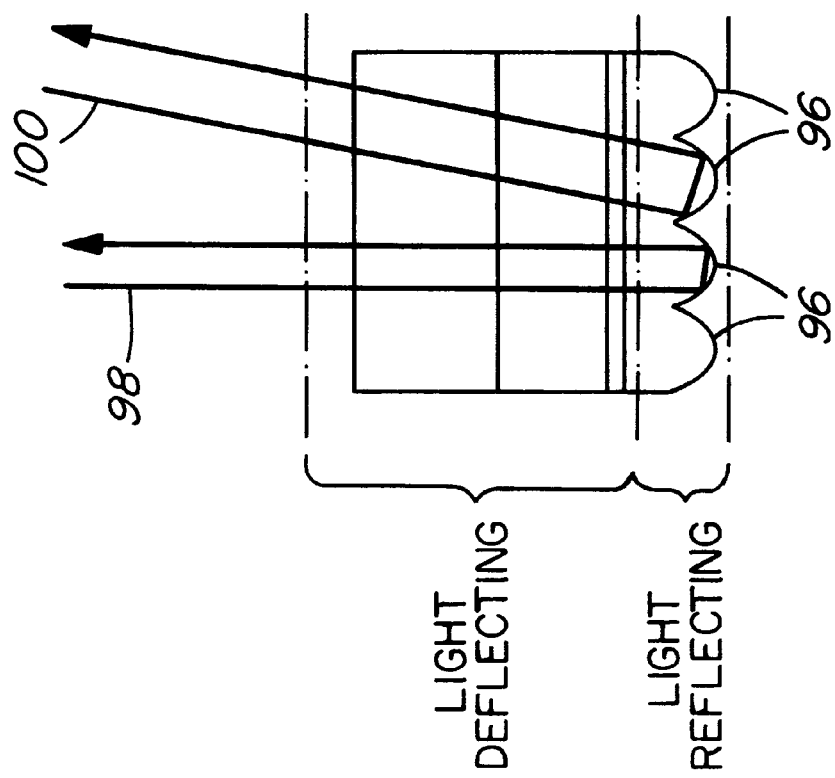

FIGS. 9A–9D demonstrate the fact that the light reflecting portion of image displays embodying the invention need not necessarily utilize right angle isosceles prisms but may incorporate other shapes having longitudinal symmetry. The reflecting portion of the display need only return a substantial fraction of the light to the light deflecting portion of the display by means of TIR, with such TIR being controllable, for example by electrophoresis as previously explained. For ease of comparison, FIG. 9A depicts an image display having a light reflecting portion—incorporating right angle isosceles prisms 88 as previously described in relation to FIGS. 8A–8B, and shows light ray 90 twice undergoing TIR at one of prisms 88. FIG. 9B depicts an image display similar to that of FIGS. 8A–8B, but having a light reflecting portion incorporating trapezoidal structures 92 instead of right angle isosceles prisms, and shows light ray 94 thrice undergoing TIR at one of structures 92. FIG. 9C depicts an image display similar to that of FIGS. 8A–8B, but having a light reflecting portion incorporating parabolic structures 96 instead of right angle isosceles prisms, and shows light ray 98 twice undergoing TIR at one of structures 96. Trapezoidal structures 92 of the FIG. 9B display are subject to the disadvantage that light rays which initially encounter the horizontal flat lowermost (as viewed in FIG. 9B) surfaces of structures 92 may pass directly therethrough without being reflected and are thus "lost". Parabolic structures 96 of the FIG. 9C display have the advantage that some light rays which twice undergo TIR, such as ray 100, are not returned in the normal incident direction (as is ray 98) but are instead returned in a direction characteristic of a mirror reflection, which may be advantageous in circumstances where a retro-reflective characteristic is undesirable. FIG. 9D depicts an image display similar to that of FIGS. 8A–8B, but having a light reflecting portion with outward facing 60° isosceles prisms 102 which refract light ray 104 to a sufficient extent that TIR occurs at planar inward surface 106. After such TIR, outward facing prisms 102 again refract the light ray, returning it in substantially the incident direction (as is also the case for rays 90, 94 and 98, as shown in FIGS. 9A, 9B, and 9C respectively). The FIG. 9D embodiment has the advantage that both inward and outward surfaces 106, 108 are planar, which may simplify manufacture. However, TIR occurs only once, not twice, in the FIG. 9D embodiment; consequently, frustration of TIR must be more complete in the FIG. 9D embodiment in order to achieve the desired level of contrast. Persons skilled in the art will accordingly understand that the display's light reflecting portion may comprise a wide range of different (even random) substantially longitudinally symmetrical cross-sectional shapes having advantages such as lower manufacturing cost, decorative appearance, etc., but perhaps having reduced optical efficiency relative to right angle isosceles prisms.

As will be apparent to those skilled in the art in the light of the foregoing disclosure, many alterations and modifications are possible in the practice of this invention without departing from the spirit or scope thereof. For example, electrophoretically controlled frustration of TIR is not an essential attribute of the invention. Instead of electrophoresis medium 28 and particles 34, one could use a liquid containing a plurality of movable members, and control the members' movement into and out of the evanescent wave region adjacent the light reflecting optical system by applying suitable electromagnetic and/or mechanical forces to the members. The members need not be particulate, but could have any convenient shape, such as an elongate planar shape. The members need not be "suspended" in the liquid, but could be tethered in some fashion.

As another example, it may be advantageous for the reflected light represented by emerging ray 51 (FIGS. 3A, 3B) to have only a semispecular appearance, in order that the display surface appears white and does not reflect images of the viewer or his/her surroundings. This can be achieved by modification of the surfaces or by providing a slight diffusing characteristic to the material used to form sheet 10, for example by bonding together two single-sided prismatic sheets. In such case, the diffusion effect could be in just one of the sheets. Alternatively, if the bonding material has a slight refractive index mismatch, the flat inside surfaces could be slightly textured, or the bonding material itself could have a slight level of diffusion.

As a further example, it may in some cases be desirable to modify the prismatic structures in the light deflecting and/or light reflecting portions of the display, such that reflected rays are slightly offset relative to the perpendicular viewing direction (i.e. the normally preferred viewing direction). This can be helpful, for example, if the light source used for viewing the display is located above the viewer's head. In such case, it is desirable to accept light from the direction of the light source and reflect it substantially toward the viewer's eyes. An offset of approximately 10° to 20° in the reflection angle between the incoming direction and the outgoing direction may be advantageous in the foregoing situation. This can be achieved by appropriately altering the prisms' angular characteristics. For example, in all of the embodiments described above, a small degree of rotation of the prismatic surfaces in the display's light deflecting portion, about an axis parallel to the direction of longitudinal symmetry of the display's light reflecting portion, is sufficient to deflect the light in the desired manner.

As a still further example, the "low.refractive index medium" maintained in gap 11A in the embodiments of FIGS. 8A–8B or 9A–9D need not be a "fluid" or a "liquid". A solid transparent material having a refractive index of about 1.27 will work. A higher index material would also work, provided that the index of refraction of the adjacent materials forming the optical deflecting and reflecting systems is increased commensurately such that the ratio of the refractive indices is greater than or equal to about 1.25. The scope of the invention is to be construed in accordance with the substance defined by the following claims.

What is claimed is:

1. An image display having a preferred viewing direction, said image display comprising:
   (a) a substantially macroscopically planar light deflecting portion having longitudinal symmetry in a first direction substantially perpendicular to said preferred viewing direction;
   (b) a substantially macroscopically planar light reflecting portion having longitudinal symmetry in a second direction substantially perpendicular to said first direction and substantially perpendicular to said preferred viewing direction, said light reflecting portion substantially parallel to said light deflecting portion;
   (c) a liquid contacting said light reflecting portion;
   (d) a plurality of movable members in said liquid;
   (e) a controller for applying an electromagnetic force to said members to selectively move said members into an evanescent wave region adjacent said light reflecting portion to frustrate total internal reflection of light rays at selected points on said light reflecting portion;
   wherein:
   (i) said light deflecting portion is substantially non-light absorptive and has structured surfaces which deflect light rays incident upon said display in said preferred viewing direction toward said light reflecting portion by imparting to said incident light rays a directional component in said second direction;
   (ii) said light reflecting portion is substantially non-light absorptive and has structured surfaces which totally internally reflect said deflected light rays toward said light deflecting portion at points other than said selected points; and,
   (iii) said light deflecting portion structured surfaces deflect said totally internally reflected light rays by cancelling said directional component from said totally internally reflected light rays, such that said deflected totally internally reflected light rays emerge from said image display in a direction substantially parallel to said preferred viewing direction.

2. An image display as defined in claim 1, wherein:
   (a) said structured surfaces are prismatic surfaces;
   (b) said light deflecting portion further comprises an outward sheet surface bearing a first plurality of prisms extending parallel to one another; and,
   (c) said light reflecting portion further comprises an inward surface of said sheet bearing a second plurality of prisms extending parallel to one another and extending substantially perpendicular to said first plurality of prisms.

3. An image display as defined in claim 2, wherein said sheet is formed of a material having a refractive index greater than about 1.65.

4. An image display as defined in claim 3, wherein said liquid is an electrophoretic medium having a refractive index of about 1.27.

5. An image display as defined in claim 3, wherein said liquid is Fluorinert™ Electronic Liquid and said movable members are particles suspended in said liquid.

6. An image display device as defined in claim 3, wherein said movable members are particles having a particle diameter less than or equal to about one micron.

7. An image display device as defined in claim 3, wherein said movable members are particles having a particle diameter of about 100 nm.

8. An image display as defined in claim 2, wherein said sheet is formed of a composite polymer material having a refractive index of about 1.73.

9. An image display as defined in claim 8, wherein said liquid is an electrophoretic medium having a refractive index of about 1.27 and said movable members are particles suspended in said electrophoretic medium.

10. An image display as defined in claim 8, wherein said liquid is Fluorinert™ Electronic Liquid and said movable members are particles suspended in said liquid.

11. An image display device as defined in claim 8, wherein said movable members are particles having a particle diameter less than or equal to about one micron.

12. An image display device as defined in claim 8, wherein said movable members are particles having a particle diameter of about 100 nm.

13. An image display as defined in claim 2, wherein said first plurality of prisms are 60° angle isosceles prisms and said second plurality of prisms are right angle isosceles prisms.

14. An image display as defined in claim 1, wherein:
(a) said structured surfaces are prismatic surfaces;
(b) said light deflecting portion further comprises:
   (i) a first sheet having an outward surface bearing a first plurality of prisms extending parallel to one another and having an opposed flat inward surface;
   (ii) an outward surface of a second sheet substantially parallel to said first sheet, said second sheet outward surface bearing a second plurality of prisms extending parallel to one another and extending parallel to said first plurality of prisms;
   (iii) an air gap between said first and second sheets; and,
(c) said light reflecting portion further comprises a third plurality of prisms on an inward surface of said second sheet, said third plurality of prisms extending parallel to one another and extending substantially perpendicular to said first and said second pluralities of prisms.

15. An image display as defined in claim 14, wherein said sheets are formed of a material having a refractive index greater than or equal to about 1.6.

16. An image display as defined in claim 15, wherein said liquid is an electrophoretic medium having a refractive index of about 1.27 and said movable members are particles suspended in said electrophoretic medium.

17. An image display device as defined in claim 15, wherein said movable members are particles having a particle diameter less than or equal to about one micron.

18. An image display device as defined in claim 15, wherein said movable members are particles having a particle diameter of about 100 nm.

19. An image display as defined in claim 15, wherein said liquid is Fluorinert™ Electronic Liquid and said movable members are particles suspended in said liquid.

20. An image display as defined in claim 14, wherein:
(a) said first plurality of prisms are isosceles prisms with apices subtending an angle θ which varies as a function of the refractive index of said first sheet; and,
(b) said second and said third pluralities of prisms are right angle isosceles prisms.

21. An image display as defined in claim 1, wherein:
(a) said structured surfaces are prismatic surfaces;
(b) said light deflecting portion further comprises:
   (i) a first sheet having a flat outward surface and having an opposed inward surface bearing a first plurality of prisms extending parallel to one another;
   (ii) a flat outward surface of a second sheet substantially parallel to said first sheet;
   (iii) a gap between said first and second sheets containing a low refractive index medium; and,
(c) said light reflecting portion further comprises a second plurality of prisms on an inward surface of said second sheet, said second plurality of prisms extending parallel to one another and extending substantially perpendicular to said first plurality of prisms.

22. An image display as defined in claim 21, wherein said sheets are formed of a material having a refractive index greater than or equal to about 1.6.

23. An image display as defined in claim 22, wherein said liquid is an electrophoretic medium having a refractive index of about 1.27 and said movable members are particles suspended in said electrophoretic medium.

24. An image display device as defined in claim 22, wherein said movable members are particles having a particle diameter less than or equal to about one micron.

25. An image display device as defined in claim 23, wherein said movable members are particles having a particle diameter of about 100 nm.

26. An image display as defined in claim 23, wherein said liquid is Fluorinert™ Electronic Liquid and said movable members are particles suspended in said liquid.

27. An image display as defined in claim 21, wherein said first plurality of prisms are 60° isosceles prisms and said second plurality of prisms are right angle isosceles prisms.

28. An image display as defined in claim 21, wherein said low refractive index medium has a refractive index of about 1.27.

29. An image display as defined in claim 21, wherein said low refractive index medium is Fluorinert™ Electronic Liquid.

30. An image display as defined in claim 1, wherein:
(a) said structured surfaces are prismatic surfaces;
(b) said light deflecting portion further comprises a first sheet having a flat outward surface and having an opposed inward surface bearing a first plurality of prisms extending parallel to one another;
(c) said light reflecting portion further comprises a second sheet having a flat inward surface substantially parallel to said first sheet and having an opposed outward surface bearing a second plurality of prisms extending parallel to one another and extending substantially perpendicular to said first plurality of prisms; and,
(d) said light deflecting portion further comprises a gap between said first and second sheets containing a low refractive index medium.

31. An image display as defined in claim 30, wherein said sheets are formed of a material having a refractive index greater than or equal to about 1.6.

32. An image display as defined in claim 31, wherein said liquid is an electrophoretic medium having a refractive index of about 1.27 and said movable members are particles suspended in said electrophoretic medium.

33. An image display device as defined in claim 31, wherein said movable members are particles having a particle diameter less than or equal to about one micron.

34. An image display device as defined in claim 31, wherein said movable members are particle diameter of about 100 nm.

35. An image display as defined in claim 31, wherein said liquid is Fluorinert™ Electronic Liquid and said movable members are particles suspended in said liquid.

36. An image display as defined in claim 30, wherein said first and second pluralities of prisms are 60° isosceles prisms.

37. An image display as defined in claim 30, wherein said low refractive index medium has a refractive index of about 1.27.

38. An image display as defined in claim 30, wherein said low refractive index medium is Fluorinert™ Electronic Liquid.

39. An image display as defined in claim 1, wherein said structured surfaces are trapezoidal surfaces.

40. An image display as defined in claim 1, wherein said structured surfaces parabolic surfaces.

41. An image display as defined in claim 1, wherein said light deflecting portion structured surfaces are prismatic surfaces rotated about an axis parallel to said second direction to offset said deflected light rays about 10°–20° relative to said preferred viewing direction.

42. An method of displaying images for viewing said images in a preferred viewing direction, said method characterized by:

(a) deflecting light rays incident in said preferred viewing direction through a longitudinally symmetrical deflector toward a longitudinally symmetrical reflector by imparting to said light rays a directional component in a direction of longitudinal symmetry of said reflector;

(b) frustrating total internal reflection of said deflected light rays at selected points on said reflector;

(c) totally internally reflecting said deflected light rays at points on said reflector other than said selected points;

(d) cancelling said directional component from said totally internally reflected light rays by deflecting said totally internally reflected rays through said deflector such that said deflected totally internally reflected light rays are substantially parallel to said preferred viewing direction;

wherein:

(i) said deflector has a direction of longitudinal symmetry substantially perpendicular to said direction of longitudinal symmetry of said reflector; and, (ii) said directions of longitudinal symmetry are substantially mutually perpendicular to said preferred viewing direction.

43. A method as defined in claim 42, wherein said frustrating total internal reflection further comprises electrophoretically moving a plurality of particles into an evanescent wave region adjacent said selected points on said reflector.

\* \* \* \* \*

UNITED STATES PATENT AND TRADEMARK OFFICE
CERTIFICATE OF CORRECTION

PATENT NO.    : 6,304,365 B1                                      Page 1 of 1
DATED         : October 16, 2001
INVENTOR(S)   : Lorne A. Whitehead It is certified that error appears in the above-identified patent and that said Letters Patent is hereby corrected as shown below:

Column 1,
Line 50, delete "arcs in" and insert therefor -- arcsin --.
Line 52, delete "arcs in" and insert therefor -- arcsin --.
Line 55, delete "$n_{1/n2}$" and insert therefor -- $n_1/n_2$ --.

Signed and Sealed this

Twenty-third Day of July, 2002

*Attest:*

*Attesting Officer*

JAMES E. ROGAN
*Director of the United States Patent and Trademark Office*